(12) United States Patent
Kalman

(10) Patent No.: US 7,299,869 B2
(45) Date of Patent: Nov. 27, 2007

(54) CARBON FOAM PARTICULATES AND METHODS OF USING CARBON FOAM PARTICULATES IN SUBTERRANEAN APPLICATIONS

(75) Inventor: Mark D. Kalman, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 230 days.

(21) Appl. No.: 10/933,705

(22) Filed: Sep. 3, 2004

(65) Prior Publication Data
US 2006/0048938 A1   Mar. 9, 2006

(51) Int. Cl.
  E21B 43/02   (2006.01)
  E21B 43/04   (2006.01)
  E21B 43/267  (2006.01)
(52) U.S. Cl. ............... 166/276; 166/278; 166/280.2; 166/281; 166/308.6; 507/219; 507/906; 507/924
(58) Field of Classification Search ............. 166/280.2, 166/308.6, 276, 278, 281, 295, 305.1; 507/906, 507/924, 202, 219
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,245,866 A * | 4/1966 | Schott | 428/402 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,664,420 A * | 5/1972 | Graham et al. | 166/280.2 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,045 A * | 7/1984 | Elson et al. | 166/278 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis | 252/8.551 |
| 4,716,964 A | 1/1988 | Erbstoesser | 166/284 |
| 4,785,884 A | 11/1988 | Armbruster | 166/280 |
| 4,796,701 A * | 1/1989 | Hudson et al. | 166/278 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |

(Continued)

FOREIGN PATENT DOCUMENTS

EP   0 510 762 A2   4/1992

(Continued)

OTHER PUBLICATIONS

Simmons, et al., *Poly(phenyllactide): Synthesis, Characterization, and Hydrolytic Degradation*, Biomacromolecules, vol. 2, No. 2, 2001 (pp. 658-663).

(Continued)

Primary Examiner—George Suchfield
(74) Attorney, Agent, or Firm—Robert A. Kent; Baker Botts

(57) ABSTRACT

The present invention relates to carbon foam particulates and their use in subterranean applications such as production enhancement and completion. One embodiment of the present invention provides a method of treating a subterranean formation using a servicing fluid comprising providing a slurry comprising a carrier fluid and open-cell carbon foam particulates; and, placing the slurry into a portion of a subterranean formation. Another embodiment of the present invention provides a particulate suitable for use as proppant or gravel in a subterranean application comprising a foamed, cellular structure.

36 Claims, No Drawings

U.S. PATENT DOCUMENTS

| | | | |
|---|---|---|---|
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/280 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,302,207 B1 | 10/2001 | Nguyen et al. | 166/276 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,656,238 B1 | 12/2003 | Rogers et al. | 44/620 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,832,650 B2 * | 12/2004 | Nguyen et al. | 166/279 |
| 6,896,058 B2 | 5/2005 | Munoz, Jr. et al. | 166/279 |
| 6,949,491 B2 | 9/2005 | Cooke, Jr. | 507/219 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0215354 A1 * | 11/2003 | Clark et al. | 422/22 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0123985 A1 * | 7/2004 | Whitfill et al. | 166/294 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0206499 A1 * | 10/2004 | Nguyen et al. | 166/280.2 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Monoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | 166/278 |
| 2005/0252659 A1 | 11/2005 | Sullivan et al. | 166/280.1 |
| 2005/0272613 A1 | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 2/1999 |
| EP | 0 879 935 A3 | 10/1999 |
| EP | 1 413 710 A1 | 4/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 A1 | 6/1999 |
| WO | WO 00/57022 | 9/2000 |
| WO | WO 01/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/022914 | 3/2004 |
| WO | WO 2004/037946 A1 | 5/2004 |

WO WO 2004/038176 A1 5/2004

OTHER PUBLICATIONS

Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost Effective Method for Stimulating Untapped Reserves*, HO2319R, Halliburton Energy Services, 2000.
Blauch, et al, *Aqueous Tackifier and Methods of Controlling Particulates*, U.S. Appl. No. 10/864,061, filed Jun. 9, 2004.
Blauch, et al, *Aqueous-Based Tackifier Fluids and Methods of Use*, U.S. Appl. No. 10/864,618, filed Jun. 9, 2004.
U.S. Appl. No. 10/650,101, Todd et al., filed Aug. 26, 2003.
U.S. Appl. No. 10/655,883, Nguyen, filed Sep. 5, 2003.
U.S. Appl. No. 10/661,173, Todd, et al, filed Sep. 11, 2003.
U.S. Appl. No. 10/664,126, Todd, et al, filed Sep. 17, 2003.
U.S. Appl. No. 10/736,152, Todd, filed Dec. 15, 2003.
U.S. Appl. No. 10/765,334, Todd, et al, filed Jan. 27, 2004.
U.S. Appl. No. 10/768,323, Roddy, et al, filed Jan. 30, 2004.
U.S. Appl. No. 10/768,864, Roddy, et al, filed Jan. 30, 2004.
U.S. Appl. No. 10/769,490, Roddy, et al, filed Jan. 30, 2004.
U.S. Appl. No. 10/783,207, Surjaatmadja, et al, filed Feb. 20, 2004.
U.S. Appl. No. 10/785,300, Frost, et al, filed Feb. 24, 2004.
U.S. Appl. No. 10/802,340, Reddy, et al, filed Mar. 17, 2004.
U.S. Appl. No. 10/803,668, Todd, et al, filed Mar. 17, 2004.
U.S. Appl. No. 10/803,689, Todd, et al, filed Mar. 18, 2004.
U.S. Appl. No. 10/832,163, Munoz, Jr. et al, filed Apr. 26, 2004.
U.S. Appl. No. 10/897,509, Pauls, et al, filed Jul. 23, 2004.
U.S. Appl. No. 10/915,024, Nguyen., filed Aug. 10, 2004.
U.S. Appl. No. 10/932,749, Harris et al, filed Sep. 2, 2004.
Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.
M. Ahmad, et al.: "Ortho Ester Hydrolysis: Direct Evidence for a Three-Stage Reaction Mechanism, " Engineering Information Inc., NY, NY, vol. 101, No. 10 (XP-002322843), May 9, 1979.
Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho esters)—From Concept To Reality*, Biomacromolecules, vol. 5, No. 5, 2004, (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemical "Trigger" Useful for Oilfield Applications*, Society of Petroleum Engineers, Inc., SPE 92709, Feb. 4, 2005.

* cited by examiner

CARBON FOAM PARTICULATES AND METHODS OF USING CARBON FOAM PARTICULATES IN SUBTERRANEAN APPLICATIONS

BACKGROUND

The present invention relates to improved particulates and methods of using such particulates in subterranean applications. More particularly, the present invention relates to high strength carbon foam particulates and their use in subterranean applications such as production enhancement and completion.

Particulates are used in a variety of operations and treatments performed in oil and gas wells. Such operations and treatments include, but are not limited to, production stimulation operations such as fracturing and well completion operations such as gravel packing and combinations operations such as frac-packing.

An example of a production stimulation operation using particulates is hydraulic fracturing. That is, a type of servicing fluid, referred to in the art as a fracturing fluid, is pumped through a well bore into a subterranean zone to be stimulated at a rate and pressure such that fractures are formed and extended into the subterranean zone. The fracture or fractures may be horizontal or vertical, with the latter usually predominating, and with the tendency toward vertical fractures increasing with the depth of the formation being fractured. The fracturing fluid is generally a gel, emulsion, or foam that comprises a particulate material often referred to as proppant. The proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using particulates is gravel packing. Gravel packing treatments are used, inter alia, to reduce the migration of unconsolidated formation particulates into the well bore. In gravel packing operations, particles referred to in the art as gravel are carried to a well bore in a subterranean producing zone by a hydrocarbon or water carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel sized to prevent the passage of formation particulates through the pack with produced fluids. The gravel pack screen is generally a filter assembly used to support and retain the gravel placed during the gravel pack operation. A wide range of sizes and screen configurations are available to suit the characteristics of a well bore, the production fluid, and any particulates in the subterranean formation. When installing the gravel pack, the gravel is carried to the formation in the form of a slurry by mixing the gravel with a viscosified carrier fluid. Once the gravel is placed in the well bore, the viscosity of the carrier fluid is reduced and it is returned to the surface. Such gravel packs are used to stabilize the formation while causing minimal impairment to well productivity. The gravel, inter alia, acts to the prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

Fracturing fluids, gravel packing carrier fluids and frac pack fluids generally must be highly viscous to be able to suspend particulates. To achieve a high viscosity, viscosifiers often are added to such fluids. Such viscosifiers are expensive. Moreover, as a fracture or a gravel pack is created a portion of the liquid contained in the fluid may leak off into the formation and/or may create an undesirable filter cake comprising deposited viscosifier on the walls of the fracture, well bore, or the formation.

Filter cakes are sometimes desirable to aid in preventing drilling and other servicing fluids from being lost in the formation and to prevent solids from entering the porosities of the producing formation. However, just as a filter cake may block the loss of fluids into the formation, the same filter cake may block the production of fluids from the formation. Thus, the presence of a filter cake on a producing zone is generally undesirable when a subterranean formation is returned to production. Moreover, residue of viscosifiers used in subterranean applications often remains on the particulates transported in the viscosified fluid and may reduce the conductivity of packs made from such particulates.

Also, as more wells are being drilled in deep water and in high temperature zones, gravel packing in long open horizontal well bores is becoming more prevalent. Completion operations in these wells generally involve the use of reduced-specific gravity particulates that are resistant to degradation in the presence of hostile conditions such as high temperatures and subterranean treatment chemicals. In order to prevent damage to these producing zones by gravel packing operations, the treating fluid carrying the particles should generally exhibit a relatively low viscosity by using low concentrations of gel polymers. Similarly, fracture stimulation treatments carried out in deep, high temperature wells may require similar reduced-specific gravity particles suspending in lower viscosity fluids.

Traditional high-strength particulates used in subterranean applications often exhibit too high of a specific gravity to be suspended in such lower viscosity fluids. While low specific gravity particulates, such as walnut hulls are well known in the art, generally they are not able to withstand significant closure stresses over time at elevated subterranean temperatures. Similarly, a variety of lightweight particles formed of thermoplastic materials including polyolefins, polystyrene divinylbenzene, polyfluorocarbons, polyethers, etherketones, and polyamide imides are commercially available. However, when these particles are exposed to temperatures above about 150° F., they soften and deform, and are not suitable in all well bores.

SUMMARY OF THE INVENTION

The present invention relates to improved particulates and methods of using such particulates in subterranean applications. More particularly, the present invention relates to carbon foam particulates and their use in subterranean applications such as production enhancement and completion.

One embodiment of the present invention provides a method of treating a subterranean formation using a servicing fluid comprising providing a slurry comprising a carrier fluid and open-cell carbon foam particulates; and, placing the slurry into a portion of a subterranean formation.

Another embodiment of the present invention provides a method of forming a proppant pack in a portion of a subterranean formation using a servicing fluid comprising providing a slurry comprising a carrier fluid and open-cell carbon foam particulates; and, placing the slurry into at least one fracture in a subterranean formation; and, depositing at least a portion of the open-cell carbon foam particulates in at least a portion of the fracture so as to form a particulate pack.

Another embodiment of the present invention provides a method of gravel packing comprising providing a slurry comprising a carrier fluid and open-cell carbon foam particulates; placing the slurry in a region of a well bore such that at least a portion of the carbon foam particulates form a gravel pack substantially adjacent to the well bore.

Another embodiment of the present invention provides a particulate suitable for use as proppant or gravel in a subterranean application comprising a foamed, cellular structure.

Other and further features and advantages of the present invention will be readily apparent to those skilled in the art upon a reading of the description of preferred embodiments which follows.

DESCRIPTION OF PREFERRED EMBODIMENTS

The present invention relates to improved particulates and methods of using such particulates in subterranean applications. More particularly, the present invention relates to open-cell carbon foam particulates and their use in subterranean applications such as production enhancement and completion.

The carbon foam particulates of the present invention comprise open-cell carbon foam particulates. The particulates of the present invention preferably have low specific gravities, preferably below about 2. The particulates of the present invention generally can withstand crush strengths of at least about 500 psi; certain embodiments may withstand crush strength of 6,000 psi or more. In some embodiments, the crush strength a particulate of the present invention can withstand may be increased by coating the particulate with a material capable of adding strength, such embodiments are described in more detail below. The physical properties of such foam pellets (such as specific gravity and crush strength) may be controlled in part by controlling the mean pore diameters of the foam cells and the specific surface area of the pellets. As the percentage and size of foam cells in the particulate increases, its specific gravity will decrease and its crush strength will decrease. By controlling the percentage and size of foam cells in the particulate it is possible to tailor a proppant for the specific gravity and crush strength needed in a particular application.

Cellular materials are the most efficient structure for many applications from the perspective of the ratio of such material's weight to strength. Cellular material are one of the most common structures found naturally in load bearing applications, such as in bone and wood formation. The use of cellular materials allows modifications to obtain the simultaneous combination of stiffness and strength in response to overall weight. Techniques now exist for fabricating foams not only of polymers, but of metals, ceramics, and glasses. These newer foams are increasingly being used structurally, for insulation, and in systems for absorbing the kinetic energy of impacts. Their uses exploit the unique combination of properties offered by cellular solids, properties that ultimately derive from the cellular structure of the material.

Proppant particulates prepared from foamed, cellular structures may be derived from several techniques that are used to produce engineering structural foams. Some such materials may be produced using a foamed polymer as the starting material. The particulate structure can be obtained by spraying or atomizing a foaming agent, or may be obtained by cutting or grinding of an existing solid foamed substance to a desirable granule size. From these precursors, processing routes have been established for the production of ceramic and metallic foams. Ceramic foams may be produced by dipping a polymer foam into a slurry containing an appropriate binder and a ceramic phase, followed by sintering the dipped foam at elevated temperatures. A second process used to make metallic foams uses a process for the deposition of a metal onto the polymer foam precursor via electrolytic deposition.

A third process begins with the pyrolysis of the thermosetting plastic foam to obtain a carbonaceous foam skeleton that is thermally stable, low in weight and density, and chemically pure. Such foams have low thermal expansion and resist thermal stress and shock. The foam skeleton may then be infiltrated with refractory material(s) using a combination of chemical-vapor-deposition (CVD)/chemical-vapor-infiltration (CVI) technique. As used here, the term "refractory material" refers to refractory metals (e.g. zirconium, niobium, hafnium, tantalum, tungsten, rhenium) and their ceramic compounds (e.g. the oxides, nitrides, carbides, borides, and silicides). In this process, 10 to 1000 microns of the desired refractory metal or ceramic are deposited onto the interior surfaces of the reticulate carbon foam. The structural integrity of the resultant refractory foam composite material may be enhanced by such deposits. In fact, the properties of the composite may be dominated by the structure and properties of such deposits. The mechanical properties for a given material are often one to two orders of magnitude higher compared to slurry-cast materials because the CVD deposit may be up to 100% dense and have grain sizes less than 5 microns, sometime less than 1 micron. Thus, a CVD/CVI technique may be preferred. The open-pore carbon foam precursor may then be heated to the temperature suitable for the desired deposition reaction, while the reactant gases are pulled through it. The gaseous precursor compound is reduced or deposited at the foam surfaces, forming a uniform nanolayered deposit throughout the internal structure of the foam, with the nanolayering adding enhanced mechanical properties. The foam structure lattice may function, inter alia, as a substrate for the material being deposited.

It is important to note that, in the process described above, the structural integrity of the proppant particulate prepared from fabricated foam composite is primarily provided by the deposited thin films, rather than the foamed carbon substrate. In the case of carbon foams, these films have much higher elastic moduli than the thin sections of vitreous carbon in the foam. Their high stiffness relative to the carbon results in their supporting the mechanical load for the entire body, ensuring that failure does not occur in the carbon. Because of the superior properties of the deposited films, the individual ligaments act as microcellular materials, with 70-100% of the strength being contributed by the deposit.

Carbon foams suitable for use preparing particulates may be fabricated from any material that can be deposited by CVD/CVI or that can be used with dipping or electrolytic deposition methods. Stiffness, strength, thermal conductivity, and overall weight may be simultaneously optimized for a given required parameter (i.e. crush strength and particle density) by varying the chosen deposited materials and their densities.

The particulates of the present invention are preferably spherical. The term "spherical" is used in this invention will designate particulates having an average ratio of minimum diameter to maximum diameter of about 0.7 or greater. The size of the particulates of the present invention is generally about 8 U.S. mesh or smaller. Having such a particle size allows the particulates to be useful in sand control operations such as gravel packing and production enhancing operations such as fracturing. One skilled in the art with the benefit of this disclosure will recognize the appropriate size for a given application.

The carbon foam particulates of the present invention may be coated with various coating substances known in the art. These coating may be used, for example, to impart consolidation, to control formation fines, to increase the sphericity of the particle, to modify the density, or to coat the pores on the surface of the particle so that they do not present a barrier to the effect slurrying of the particulate in a carrier fluid. The coating may be either permanent (as in the case of a resinous coating), semi-permanent (as on the case of a tackifying coating), or temporary (as in the case of a degradable coating such as polylactic acid).

Suitable resinous coatings include those resins that are capable of forming a hardened, consolidated mass. Suitable resins include, but are not limited to, novolak resins, polyepoxide resins, phenol-aldehyde resins, urea-aldehyde resins, urethane resins, phenolic resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Suitable tackifying coating for use in coating proppant used in the present invention comprise any compound that, when in liquid form or in a solvent solution, will form a non-hardening coating upon a particulate. Such compounds are commonly referred to as tackifying agents. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. No. 5,853,048 issued to Weaver, et al. and U.S. Pat. No. 5,833,000 issued to Weaver, et al., the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Still another alternative type of coating suitable for use in the present invention is a degradable coating material. Degradable coating materials not only act to lower the density of the particulate, but the products of the degradation may be useful in the subterranean formation beyond their use in lowering the particulate's density. For example, when the products of the degradation are acids, they, may be used to break the servicing fluid transporting the coated particulate or to degrade a filter cake neighboring the particulate. Any material that is capable of improving the shape of the particulate and then degrading over time may be suitable, so long as the material or the products of the degradation do not undesirably interfere with either the conductivity of a resultant particulate matrix or the production of any of the fluids from the subterranean formation.

Nonlimiting examples of degradable materials that may be used in conjunction with the present invention include but are not limited to degradable polymers. Such degradable materials are capable of undergoing an irreversible degradation down hole. The term "irreversible" as used herein means that the degradable material, once degraded down hole, should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred.

Polyanhydrides are another type of particularly suitable degradable polymer useful in the present invention. Polyanhydride hydrolysis proceeds, inter alia, via free carboxylic, acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly (dodecanedioic anhydride). Other suitable examples include but are not limited to poly(maleic anhydride) and poly (benzoic anhydride).

Blends of certain degradable materials may also be suitable. One example of a suitable blend of materials is a mixture of poly(lactic acid) and poly(glycolides). Other materials that undergo an irreversible degradation may also be suitable, if the products of the degradation do not undesirably interfere with either the conductivity of the particulate matrix or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

A preferable result may be achieved if the degradable material degrades slowly over time as opposed to instantaneously. Even more preferable results have been obtained when the degradable material does not begin to degrade until after a particulate matrix has substantially developed. The slow degradation of the degradable material, inter alia, helps to maintain the stability of the proppant matrix.

One embodiment of a method of the present invention provides an improved method of treating a subterranean formation using a servicing fluid comprising a hydrocarbon or water carrier fluid and carbon foam particulates of the present invention suspended therein. In the treatment methods of the present invention, a servicing fluid comprising a hydrocarbon or water carrier fluid comprising carbon foam particulates of the present invention suspended therein is placed into a subterranean formation and then the carrier fluid's viscosity is reduced so as to deposit at least a portion of the carbon foam particulates in a desired location in the subterranean formation.

Still another method of the present invention provides an improved method of hydraulic fracturing using reduced specific gravity particulates of the present invention. In some hydraulic fracturing methods of present invention, a first fluid is placed in the subterranean formation at a rate and pressure sufficient to form at least one fracture in the subterranean formation. Next, a second fluid comprising carbon foam particulates of the present invention is placed into the fractures. Next, the viscosity of the first fluid is reduced, inter alia, to facilitate its removal from the subterranean formation and the viscosity of the second fluid is reduced, inter alia, to deposit the suspended carbon foam particulates in the fracture and, inter alia, to facilitate the removal of the second fluid from the subterranean formation. Finally, the reduced viscosity first fluid and second fluid are substantially removed from the fracture and the subterranean formation.

Another method of the present invention provides an improved method of gravel packing a delivery fluid comprising a hydrocarbon or water carrier fluid comprising carbon foam particulates of the present invention suspended therein. In some of the gravel packing methods of the present invention, a gravel pack composition comprising a carrier fluid having carbon foam particulates of the present invention suspended therein is placed in a region of a well bore such that at least a portion of the carbon foam particulates form a gravel pack substantially adjacent to the well bore. Then the viscosity of the delivery fluid remaining in the well bore may be reduced so that it may then be removed from the subterranean formation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation using a servicing fluid comprising:
   providing a slurry comprising a carrier fluid and open-cell carbon foam particulates; and,
   placing the slurry into a portion of a subterranean formation.

2. The method of claim 1 wherein the open-cell carbon foam particulates have a specific gravity of below about 2.

3. The method of claim 1 wherein the open-cell carbon foam particulates can substantially withstand a crush strength of at least about 500 psi.

4. The method of claim 1 wherein the open-cell carbon foam particulates can substantially withstand a crush strength of at least about 6,000 psi.

5. The method of claim 1 wherein the open-cell carbon foam particulates are substantially spherical.

6. The method of claim 1 wherein the open-cell carbon foam particulates are coated with a resin wherein the resin comprises at least one resin selected from the group consisting of a novolak resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and a combination thereof.

7. The method of claim 1 wherein the open-cell carbon foam particulates are coated with a tackifying coating wherein the tackifying coating comprises at least one material selected from the group consisting of a polyamide, a condensation reaction product of a polyacid and a polyamine, a polyester; a polycarbonate, a polycarbamate, a natural resin and a combination thereof.

8. The method of claim 7 wherein the tackifying coating further comprises a multifunctional material and wherein the multifunctional material comprises at least one material selected from the group consisting of an aldehyde, a dialdehydes, a hemiacetal, an aldehyde releasing compound, a diacid halide, a dihalide, a polyacid anhydride, an epoxide, a furfuraldehyde, a glutaraldehyde, an aldehyde condensate, and a combination thereof.

9. The method of claim 1 wherein the open-cell carbon foam particulates are coated with a degradable coating material.

10. The method of claim 9 wherein the degradable coating material comprises a degradable polymer.

11. The method of claim 10 wherein the degradable coating material comprises at least one material selected from the group consisting of a polysaccharide, a chitin, a chitosan, a protein, an aliphatic polyester, a poly(lactide), a poly(glycolide), a poly(ε-caprolactone), a poly(hydroxybutyrate), a poly(anhydride), an aliphatic polycarbonate, a poly(orthoester), a poly(amino acid), a poly(ethylene oxide), a polyphosphazene, and a combination thereof.

12. The method of claim 10 wherein the degradable coating material comprises a stereoisomer of poly(lactide).

13. A method of forming a proppant pack in a portion of a subterranean formation using a servicing fluid comprising:
   providing a slurry comprising a carrier fluid and open-cell carbon foam particulates; and,
   placing the slurry into at least one fracture in a subterranean formation; and,
   depositing at least a portion of the open-cell carbon foam particulates in at least a portion of the fracture so as to form a particulate pack.

14. The method of claim 13 wherein the open-cell carbon foam particulates have a specific gravity of below about 2.

15. The method of claim 13 wherein the open-cell carbon foam particulates can substantially withstand a crush strength of at least about 500 psi.

16. The method of claim 13 wherein the open-cell carbon foam particulates can substantially withstand a crush strength of at least about 6,000 psi.

17. The method of claim 13 wherein the open-cell carbon foam particulates are substantially spherical.

18. The method of claim 13 wherein the open-cell carbon foam particulates are coated with a resin wherein the resin comprises at least one resin selected from the group consisting of a novolak resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and a combination thereof.

19. The method of claim 13 wherein the open-cell carbon foam particulates are coated with a tackifying coating wherein the tackifying coating comprises at least one material selected from the group consisting of a polyamide, a condensation reaction product of a polyacid and a polyamine, a polyester; a polycarbonate, a polycarbamate, a natural resin and a combination thereof.

20. The method of claim 19 wherein the tackifying coating further comprises a multifunctional material and wherein the multifunctional material comprises at least one material selected from the group consisting of an aldehyde, a dialdehyde, a hemiacetal, an aldehyde releasing compound, a diacid halide, a dihalide, a polyacid anhydride, an epoxide, a furfuraldehyde, a glutaraldehyde, an aldehyde condensate, and a combination thereof.

21. The method of claim 13 wherein the open-cell carbon foam particulates are coated with a degradable coating material.

22. The method of claim 21 wherein the degradable coating material comprises a degradable polymer.

23. The method of claim 22 wherein the degradable coating material comprises at least one material selected from the group consisting of a polysaccharide, a chitin, a chitosan, a protein, an aliphatic polyester, a poly(lactide), a poly(glycolide), a poly(ε-caprolactone), a poly(hydroxybutyrate), a poly(anhydride), an aliphatic polycarbonate, a poly(orthoester), a poly(amino acid), a poly(ethylene oxide), a polyphosphazene, and a combination thereof.

24. The method of claim 22 wherein the degradable coating material comprises a stereoisomer of poly(lactide).

25. A method of gravel packing comprising:
   providing a slurry comprising a carrier fluid and open-cell carbon foam particulates;
   placing the slurry in a region of a well bore such that at least a portion of the carbon foam particulates form a gravel pack substantially adjacent to the well bore.

26. The method of claim 25 wherein open-cell carbon foam particulates have a specific gravity of below about 2.

27. The method of claim 25 wherein the open-cell carbon foam particulates can substantially withstand a crush strength of at least about 500 psi.

28. The method of claim 25 wherein the open-cell carbon foam particulates can substantially withstand a crush strength of at least about 6,000 psi.

29. The method of claim 25 wherein the open-cell carbon foam particulates are substantially spherical.

30. The method of claim 25 wherein the open-cell carbon foam particulates are coated with a resin wherein the resin comprises at least one resin selected from the group consisting of a novolak resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and a combination thereof.

31. The method of claim 25 wherein the open-cell carbon foam particulates are coated with a tackifying coating wherein the tackifying coating comprises at least one material selected from the group consisting of a polyamide, a condensation reaction product of a polyacid and a polyamine, a polyester; a polycarbonate, a polycarbamate, a natural resin and a combination thereof.

32. The method of claim 31 wherein the tackifying coating further comprises a multifunctional material and wherein the multifunctional material comprises at least one material selected from the group consisting of an aldehyde, a dialdehyde, a hemiacetal, an aldehyde releasing compound, a diacid halide, a dihalide, a polyacid anhydride, an epoxide, a furfuraldehyde, a glutaraldehyde, an aldehyde condensate, and a combination thereof.

33. The method of claim 25 wherein the open-cell carbon foam particulates are coated with a degradable coating material.

34. The method of claim 33 wherein the degradable coating material comprises a degradable polymer.

35. The method of claim 34 wherein the degradable coating material comprises at least one material selected from the group consisting of a polysaccharide, a chitin, a chitosan, a protein, an aliphatic polyester, a poly(lactide), a poly(glycolide), a poly($\epsilon$-caprolactone), a poly(hydroxybutyrate), a poly(anhydride), an aliphatic polycarbonate, a poly(orthoester), a poly(amino acid), a poly(ethylene oxide), a polyphosphazene, and a combination thereof.

36. The method of claim 34 wherein the degradable coating material comprises a stereoisomer of poly(lactide).

* * * * *

UNITED STATES PATENT AND TRADEMARK OFFICE
Certificate

Patent No. 7,299,869 B2                                                Patented: November 27, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark D. Kalman, Katy, TX (US); and Philip D. Nguyen, Duncan, OK (US).

Signed and Sealed this Twenty-third Day of June 2009.

*JENNIFER H. GAY*
*Supervisory Patent Examiner*
*Art Unit 3676*